Jan. 4, 1955  A. J. SCAIFE  2,698,591
QUICK RELEASE SECURING DEVICE FOR AMPHIBIOUS VEHICLES
Filed Feb. 13, 1945  2 Sheets-Sheet 1
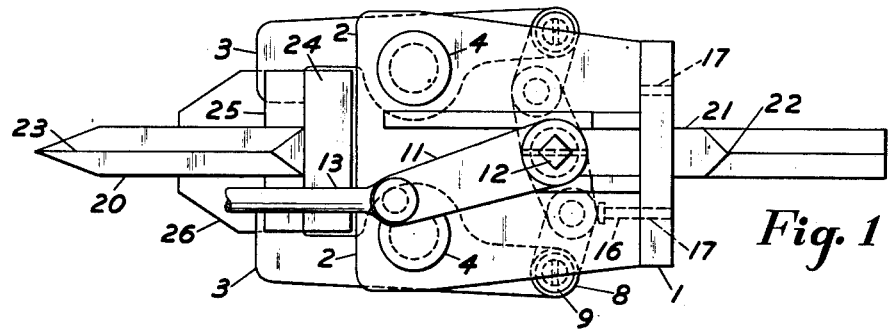
*Fig. 1*
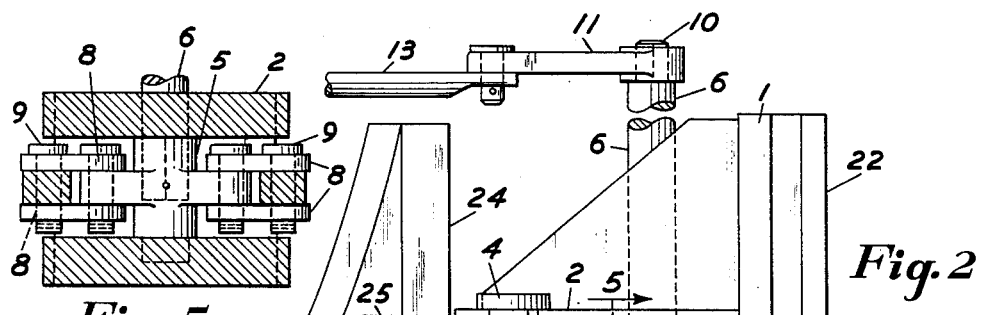
*Fig. 2*
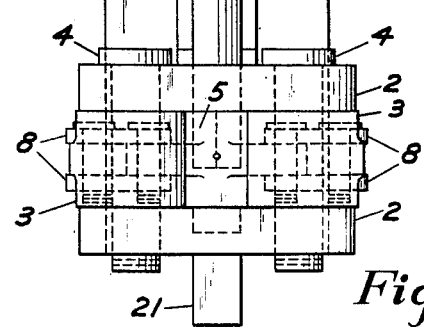
*Fig. 5*
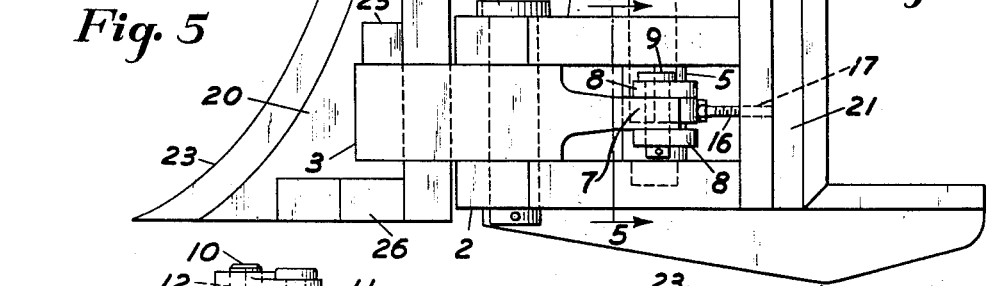
*Fig. 3*
*Fig. 4*
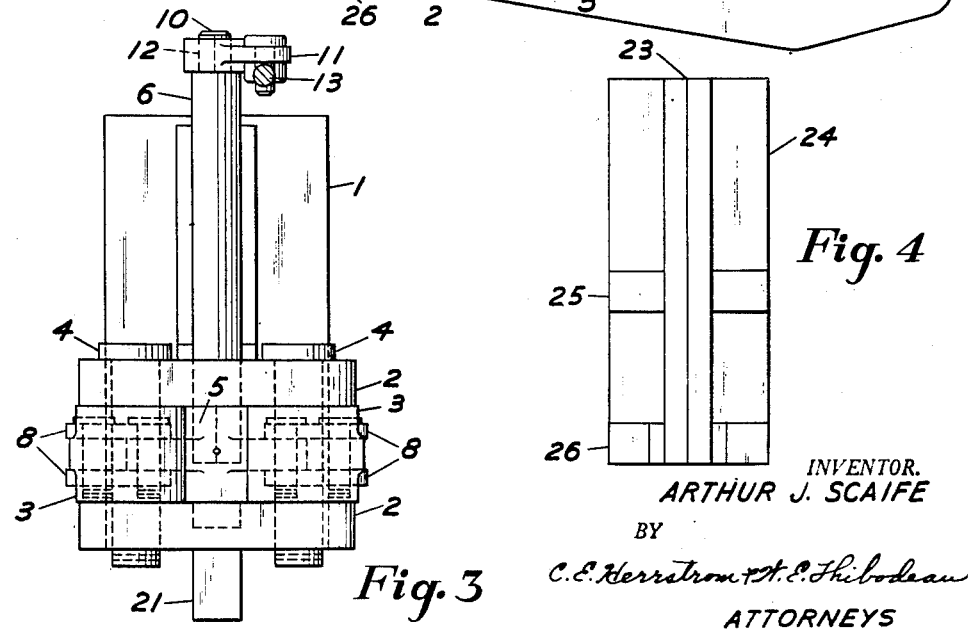
INVENTOR.
ARTHUR J. SCAIFE
BY
*C. E. Herrstrom + H. E. Thibodeau*
ATTORNEYS Jan. 4, 1955   A. J. SCAIFE   2,698,591
QUICK RELEASE SECURING DEVICE FOR AMPHIBIOUS VEHICLES
Filed Feb. 13, 1945   2 Sheets-Sheet 2

INVENTOR.
ARTHUR J. SCAIFE
BY
C. E. Herrstrom & W. E. Thibodeau
ATTORNEYS

United States Patent Office 2,698,591
Patented Jan. 4, 1955

2,698,591

QUICK RELEASE SECURING DEVICE FOR AMPHIBIOUS VEHICLES

Arthur J. Scaife, Detroit, Mich.

Application February 13, 1945, Serial No. 577,715

5 Claims. (Cl. 114—0.5)

(Granted under Title 35, U. S. Code (1952), sec. 266)

The invention described herein may be manufactured and used by or for the Government for governmental purposes, without the payment to me of any royalty thereon.

This invention relates generally to quickly releasing means and it relates more particularly to quickly releasing means for releasing buoyant chambers from the side, front or rear of a fighting amphibious vehicle.

In floating vehicles to shore, it has heretofore been necessary for the crew of the vehicle to dismount therefrom and remove the buoyant chambers or other members which float the vehicle to shore. In moving on to a beach against enemy fire, this has resulted in heavy casualties. Other devices have been tried of a quick release nature but it was found that too much force was necessary to release the buoyant members thereby not permitting indirect operation of the quickly releasing members from the inside of the tanks or other fighting vehicles.

It is, accordingly, an object of my invention to overcome the above and other defects in present quickly releasing means and it is more particularly an object of my invention to provide a quickly releasing means which is simple in construction, economical in cost, efficient in operation, and easy to install.

Another object of my invention is to provide a quickly releasing device which requires a minimum of force for the operation thereof.

Another object of my invention is to provide quickly releasing devices on the sides, front or rear of a fighting vehicle whereby buoyant members on the side, front or rear of the vehicle may be released when the vehicle touches bottom.

Another object of my invention is to provide means for releasing members on a fighting vehicle from a remote point.

Another object of my invention is to provide a quickly releasing means which may be partially locked.

Other objects of my invention will become evident from the following detailed description, taken in conjunction with the accompanying drawings, in which:

Figure 1 is a plan view of my novel quickly releasing device;

Figure 2 is a side elevational view of my novel quickly releasing device;

Figure 3 is an end elevational view of my novel quickly releasing device;

Figure 4 is an end elevational view of an adapter member for attachment to a buoyant member and to my quickly releasing device;

Figure 5 is a view taken on the line 5—5 of Figure 2;

Figure 8:
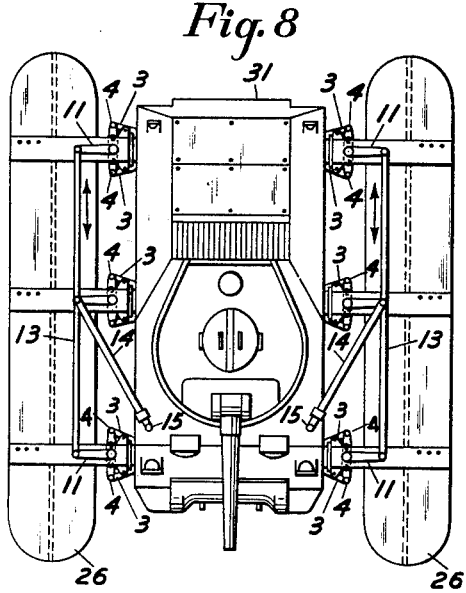
Figure 8 is a plan view of a tank vehicle with buoyant members attached to the sides thereof by my novel quickly releasing member.

Referring now to the drawings, Figs. 1, 2 and 3 show a frame member 1 with a pair of spaced bracket members 2 having jaws 3 pivoted therebetween in opposed relationship by pins 4. Connecting crank member 5 rotates with rotatable shaft 6 journaled in bracket members 2, and is connected to apertured ends 7 of the jaws 3 by link members 8 and pins 9. Shaft 6 has a square end 10 to which is engaged a lever 11 with a square socket 12 for fitting over the square end 10 of the shaft 6. Longitudinally extending rods 13, pivotally connected to levers 11, which are better shown in Fig. 8, are operated through operating members 14 which have handles 15, respectively, for manual operation. A stop member 16 is shown threadably engaged with one of the threaded apertures 17 in member 1. The connecting crank member 5, when in the position shown in Fig. 1 with the jaws 3 in operative closed position, is inclined at an angle to member 1 to provide a locking arrangement which, because of the angular disposition of link members 8 and the locking engagement of stop member 16, effectively prevents any rotation of crank member 5 in one direction, counterclockwise, and in the absence of positive operation of the manually operable means heretofore described restrains rotation of crank member 5 in the other or clockwise direction. In the locking arrangement with the angular disposition of the link members 8 as shown in Fig. 1, jaws 3 may be opened only by manual application of a minimum but positive force to the manually operable means sufficient to turn crank member 5 in the other or clockwise direction by overcoming the restraining action of the arrangement. The stop member 16 holds the link members 8 in this angular position, as shown in Fig. 1, against any undesired possible movement with attendant undesired opening of jaws 3 such as, in the absence of stop member 16, would be involved in the rotation of crank member 5 in the counterclockwise direction, stop member 16 precluding any such rotation of crank member 5 in the counterclockwise direction. Many times my quickly releasing member is under water when connection is made so that stop member 16 is used to set the link members 8 in an angular position even though they are out of sight. This locking engagement of stop member 16 is necessary in that undesirable unlocking of my novel releasing members involving rotation of crank member 5 in the counterclockwise direction would otherwise occur because of the bobbing of the buoyant members, which unlocking would be fatal to a floated tank vehicle or other floated member. It will be seen that the stop member 16 may be threadably engaged with either of the threaded apertures 17 to provide for operation in either direction; if the stop member 16 is threadably engaged with the other of the threaded apertures 17, instead of with the one thereof as shown in Fig. 1, the stop member 16 then effectively prevents rotation of crank member 5 in a clockwise direction preventing any opening of jaws 3 thereby, while rotation of crank member 5 in the other or counterclockwise direction is restrained but is permitted upon manual operation of the manually operable means. It will be evident that linkage members may be provided so that the longitudinal rod 13 may be operated from the interior of a tank vehicle.

Adapter members 20 and 21 are shown for the purposes of illustration. Adapter member 21 has a V edge 22 for attachment of my novel device to a tank vehicle by means of welding. Adapter member 20 likewise is shown with a V edge 23 for welding to a buoyant chamber or other member to be releasably attached to a vehicle. Adapter member 20 has a vertically extending rectangular member 24 for engagement with the jaws 3 and stop members 25 and 26 on adapter member 20 limit the vertical movement of a buoyant member attached to the adapter member 20. It will be evident that my novel attaching quickly releasing means may be attached to a buoyant member, and an adapter member such as adapter member 21, may be attached to a tank vehicle.

In operation, adapter member 20 is attached to a buoyant chamber by welding or the like, and adapter member 21, which is secured to frame 1, is attached to the side or end of a tank vehicle. The connecting member 13 is moved longitudinally in either direction by the operating lever 14, thereby rotating the rotatable member 5 to swing the pivotable jaws 3 on the pins 4 to open the jaws 3. The rectangular engaging member 24 of the adapter member 20 is then disposed between the jaws 3 as shown in Figure 1, the jaws 3 being disposed between the stop members 25 and 26 as shown in Figure 2. When the vehicle reaches shore where it can operate on land by tracks, or other means, the buoyant members are dropped from the vehicle by operation of the operating lever 14 to move the connecting member 13 in either direction to rotate the rotatable member 5 thereby swinging the jaws 3 on pivot pins 4 and separating the jaws 3 sufficiently to clear the stop member 25.

Figure 6:
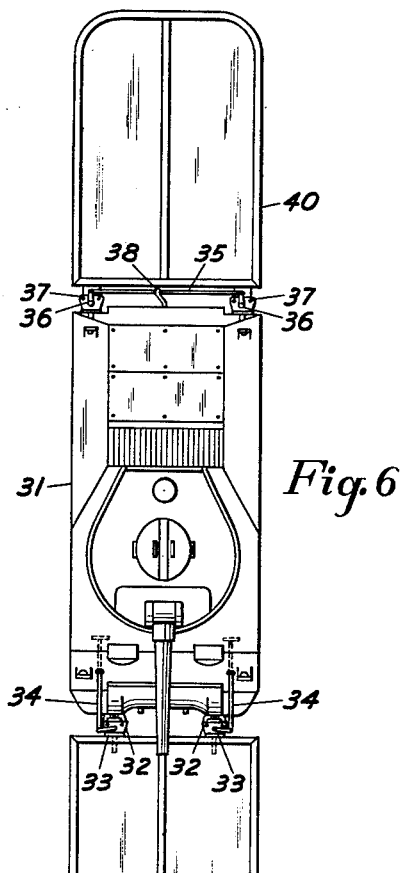
Figure 6 is a plan view showing a tank vehicle with buoyant members attached on the ends thereof with my novel quickly releasing devices.
Figure 9:
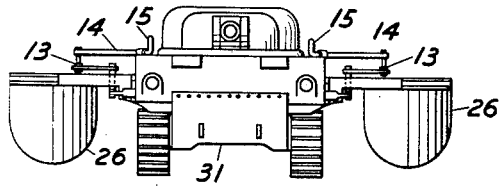
Figure 9 is an end elevational view of the tank vehicle and my members shown in Figure 8.
Figure 7:
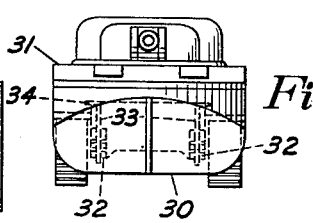
Figure 7 is an end view of the tank vehicle and buoyant members shown in Figure 6.
Figure 10:
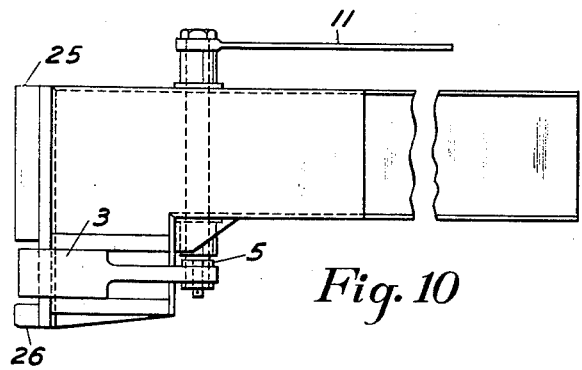
Figure 10 is an enlarged fragmentary view of my novel quickly releasing device as set forth in Figures 8 and 9.

A modified form of my invention is shown in Figures 6 and 7 wherein a buoyant member 30 is shown attached to the front end of a tank vehicle 31. Novel quickly releasing attaching members 32 have levers 33 connecting operating rods 34 extending into the front end of the tank vehicle 31. The rods 34 may be operated from the interior of the vehicle 31 by the driver of the tank vehicle or his assistant. The releasable attachment of the buoyant chamber 40 on the rear end of the vehicle 31 has a cross connecting rod 35 which connects the levers 36 of my novel quickly releasing devices 37 which may be operated by an operating lever 38, the end of which is shown connected to the central portion of the cross connecting rod 35. My novel quickly releasing devices shown in Figures 6 and 7 are the same as those shown in all of the other figures.

It will be evident from the foregoing description that I have provided a quickly releasable device which requires a minimum of force to release buoyant or other members attached to a combat vehicle when in action. This device will save many lives and permits easy operation with simple apparatus. With the arrangement of the links 8 as shown with a rotatable crank member 5 to pivot jaws 3, opening and closing of the jaws 3 is performed with a minimum of force and with a maximum of simplicity.

My quickly releasing device may be used in any situation where releasably attached members or articles are to be released in a minimum of time and with a minimum of effort.

Various changes may be made in the specific embodiment of my invention without departing from the spirit thereof or from the scope of the appended claims.

What I claim is:

1. In a quickly releasing device, the combination of a frame provided with a pair of relatively vertically spaced brackets; a pair of spaced levers pivoted in and horizontally disposed between said brackets, and provided at one end with co-acting jaws extending from said frame; a link pivoted at one end on each lever at its opposite end; a rock shaft journaled in said frame; a double lever fixed on said shaft between said brackets having its diametrical ends pivotally connected with the other ends of said links, respectively; means for rocking said shaft; and an adjustable stop member removably mounted alternatively in one of two locations in said frame, and co-acting with said double lever to limit the degree of rotation of said double lever in one of its two directions of rotation, the direction of limited rotation being selective according to the location of mounting of said stop member.

2. In a quickly releasing device for releasably connecting two objects, the combination of an element attached to one of said objects; a second element attached to the other of said objects; a vertically disposed protuberance formed on said second element; a pair of horizontally disposed levers forming a pair of co-acting claws, capable of being moved toward and away from one another, and carried by said first element, the protuberance and the claws being so relatively dimensioned that the protuberance can be passed between said claws when they are moved from one another, and is confined loosely between said claws and said first element when so passed and the claws have been moved toward one another; a double lever fixed to a shaft rotatably journaled in said first element for moving said claws, said double lever having its diametrical ends pivotally linked to respective ones of said pair of levers; and an adjustable stop member removably mounted alternatively in one of two locations in said first element, and co-acting with said double lever to limit the degree of rotation of said double lever in one of its two directions of rotation, the direction of limited rotation being selective according to the location of mounting of said stop member.

3. In a quickly releasing device for a vehicle provided with releasable chambers, the combination of a first adapter member provided with an element on its exterior surface suitable for permanent attachment to the exterior of the vehicle; a second adapter member provided with an element on its exterior surface suitable for permanent attachment to a chamber; a frame carried by said first adapter member; a pair of horizontally disposed levers pivoted in said frame and provided with co-acting jaws, respectively; means in said frame to rock said levers to move said jaws into and out of closed position; a vertically disposed flange on said second adapter member, said flange being so dimensioned that it can be passed between said jaws when said jaws are moved out of closed position, and will be confined between said jaws and said frame when it has been so passed and the jaws have been moved into closed position; and a pair of stop members carried by said second adapter member and so associated with said vertically disposed flange that they are disposed, respectively, above and below the jaws when the latter are confining said flange, thereby limiting relative vertical movement of said flange and said jaws.

4. In a quickly releasing device for an amphibious vehicle provided with releasable buoyant chambers, the combination of a first adapter member provided with an element on its exterior surface suitable for permanent attachment to the exterior of the vehicle; a second adapter member provided with an element suitable for permanent attachment to a buoyant chamber; a frame carried by said first adapter member; a pair of horizontally disposed levers pivoted in said frame and provided, respectively, with co-acting jaws adapted to confine a rectangular member when moved into closed position; means in said frame to rock said levers to move said jaws into and out of closed position; a vertically disposed rectangular member carried by said second adapter member, said rectangular member being so dimensioned that it can be passed between said jaws when said jaws are moved out of closed position, and will be confined between said jaws and said frame when it has been so passed and the jaws have been moved into closed position; and a pair of stop members carried by said second adapter member and so associated with said vertically disposed rectangular member that they are disposed, respectively, above and below the jaws when the latter are confining said rectangular member, thereby limiting relative vertical movement of said rectangular member and said jaws.

5. A quickly releasing mechanism for a buoyant chamber of an amphibious vehicle comprising, in combination, a plurality of pairs of opposed pivoted jaw members, links each connected to a respective one of said opposed pivoted jaw members of each of said pairs thereof, rotatable members each connecting the links connected to respective pairs of opposed jaw members, adjustable stop members each associated with a respective one of said rotatable members to limit the travel of said rotatable members in one direction of rotation, said direction being selective in accordance with the disposition of each of said stop members relative to the respective rotatable member associated therewith, shafts for said rotatable members, each of said rotatable members being mounted on a respective one of said shafts for rotation therewith, operating levers each on a respective one of said shafts for rotation of the latter, and a connecting member connecting said levers for simultaneous operation thereof and simultaneous closing or opening of all of the pairs of opposed pivoted jaw members at one time by simultaneously moving the jaw members of each of said pairs toward or away from each other.

References Cited in the file of this patent

UNITED STATES PATENTS

| 1,115,807 | Gellrich | Nov. 3, 1914 |
| 1,129,664 | Gilchrist et al. | Feb. 23, 1915 |
| 1,370,790 | Mund | Mar. 8, 1921 |
| 1,764,623 | Grondahl | June 17, 1930 |
| 1,807,266 | Wazlavek | May 26, 1931 |
| 1,990,673 | Shaughnessy | Feb. 12, 1935 |
| 2,024,222 | Hinchman | Dec. 17, 1935 |
| 2,350,999 | Beirise | June 13, 1944 |

FOREIGN PATENTS

| 299,076 | Germany | July 18, 1919 |